United States Patent
Newman

(10) Patent No.: US 6,766,413 B2
(45) Date of Patent: Jul. 20, 2004

(54) SYSTEMS AND METHODS FOR CACHING WITH FILE-LEVEL GRANULARITY

(75) Inventor: Otto R. Newman, Groton, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 267 days.

(21) Appl. No.: 09/797,100

(22) Filed: Mar. 1, 2001

(65) Prior Publication Data

US 2002/0124135 A1 Sep. 5, 2002

(51) Int. Cl.[7] ................. G06F 12/00; G06F 12/14; G06F 12/16; G06F 13/00; G06F 13/20
(52) U.S. Cl. ................. 711/113; 711/129; 711/133
(58) Field of Search ................. 711/104, 112, 711/113, 123, 125, 129–130, 144, 145, 153

(56) References Cited

U.S. PATENT DOCUMENTS

| | | | |
|---|---|---|---|
| 3,460,094 A | 8/1969 | Pryor | 340/172.5 |
| 3,468,241 A | 9/1969 | Leslie et al. | 100/26 |
| 3,469,239 A | 9/1969 | Richmond et al. | 340/172.5 |
| 3,469,241 A | 9/1969 | Barton et al. | 340/172.5 |
| 3,544,973 A | 12/1970 | Borck, Jr. et al. | 340/172.5 |
| 3,548,382 A | 12/1970 | Lichty et al. | 340/172.5 |
| 3,609,704 A | 9/1971 | Schurter | 340/172.5 |
| 3,641,505 A | 2/1972 | Artz et al. | 340/172.5 |
| 3,705,388 A | 12/1972 | Nishimoto | 340/172.5 |
| 3,710,324 A | 1/1973 | Cohen et al. | 340/172.5 |
| 3,736,566 A | 5/1973 | Anderson et al. | 340/172.5 |
| 3,795,901 A | 3/1974 | Boehm et al. | 340/172.5 |
| 3,805,039 A | 4/1974 | Stiffler | 235/153 |
| 3,893,084 A | 7/1975 | Kotok et al. | 340/172.5 |
| 4,015,246 A | 3/1977 | Hopkins, Jr. et al. | 340/172.5 |
| 4,040,034 A | 8/1977 | Belady et al. | 364/200 |
| 4,096,572 A | 6/1978 | Namimoto | 364/200 |
| 4,164,787 A | 8/1979 | Aranguren | 364/200 |
| 4,228,496 A | 10/1980 | Katzman et al. | 364/200 |

(List continued on next page.)

FOREIGN PATENT DOCUMENTS

| | | | |
|---|---|---|---|
| EP | 0 208 430 A1 | 1/1987 | G06F/13/32 |
| EP | 0 406 759 A3 | 1/1991 | H04L/12/56 |
| EP | 0 428 330 A3 | 5/1991 | G06F/13/30 |
| EP | 0 428 330 A2 | 5/1991 | G06F/13/32 |
| EP | 0 475 005 B1 | 11/1995 | G06F/15/16 |
| EP | 0 390 567 B1 | 6/1999 | H04L/29/06 |
| FR | 2 508 200 | 12/1982 | G06F/13/00 |

*Primary Examiner*—Nasser Moazzami
(74) *Attorney, Agent, or Firm*—Testa, Hurwitz & Thibeault, LLP

(57) ABSTRACT

Systems and methods for implementing improved disk caching in a programmed computer. Improved disk caching is achieved through apparatus and methods that permit the designation of files or types of files as memory-resident, transient, or normal (i.e., neither memory-resident or transient). The disk blocks associated with a memory-resident file are loaded immediately into cache memory in whole or in part, or are loaded on a block-by-block basis as they are accessed. The blocks of a memory-resident file remain in cache until the file is designated not memory resident, whereupon the blocks become purgeable, or until cache size limits force the removal of blocks from the cache. The blocks are purged immediately in whole or in part, or displaced gradually as blocks from other memory-resident files displace them. The blocks of a transient file are maintained in cache for a shorter duration before removal, freeing resources to cache other blocks.

22 Claims, 7 Drawing Sheets

U.S. PATENT DOCUMENTS

| | | | |
|---|---|---|---|
| 4,296,463 A | 10/1981 | Dalboussiere et al. | 364/200 |
| 4,356,550 A | 10/1982 | Katzman et al. | 364/200 |
| 4,365,295 A | 12/1982 | Katzman et al. | 364/200 |
| 4,366,535 A | 12/1982 | Cedolin et al. | 364/200 |
| 4,466,098 A | 8/1984 | Southard | 371/9 |
| 4,484,273 A | 11/1984 | Stiffler et al. | 364/200 |
| 4,493,036 A | 1/1985 | Boudreau et al. | 364/200 |
| 4,503,499 A | 3/1985 | Mason et al. | 364/200 |
| 4,574,348 A | 3/1986 | Scallon | 364/200 |
| 4,590,554 A | 5/1986 | Glazer et al. | 364/200 |
| 4,608,631 A | 8/1986 | Stiffler et al. | 364/200 |
| 4,608,688 A | 8/1986 | Hansen et al. | 371/11 |
| 4,637,024 A | 1/1987 | Dixon et al. | 371/67 |
| 4,638,425 A * | 1/1987 | Hartung | 364/200 |
| 4,672,613 A | 6/1987 | Foxworthy et al. | 371/38 |
| 4,674,037 A | 6/1987 | Funabashi et al. | 364/200 |
| 4,677,546 A | 6/1987 | Freeman et al. | 364/200 |
| 4,695,975 A | 9/1987 | Bedrij | 364/900 |
| 4,700,292 A | 10/1987 | Campanini | 364/200 |
| 4,716,523 A | 12/1987 | Burrus, Jr. et al. | 364/200 |
| 4,719,568 A | 1/1988 | Carrubba et al. | 364/200 |
| 4,774,659 A | 9/1988 | Smith et al. | 364/200 |
| 4,866,604 A | 9/1989 | Reid | 364/200 |
| 4,920,540 A | 4/1990 | Baty | 371/61 |
| 4,924,427 A | 5/1990 | Savage et al. | 364/900 |
| 4,942,517 A | 7/1990 | Cok | 364/200 |
| 4,942,519 A | 7/1990 | Nakayama | 364/200 |
| 4,965,717 A | 10/1990 | Cutts, Jr. et al. | 364/200 |
| 4,993,030 A | 2/1991 | Krakauer et al. | 371/40.1 |
| 5,020,024 A | 5/1991 | Williams | 364/900 |
| 5,115,490 A | 5/1992 | Komuro et al. | 711/202 |
| 5,175,855 A | 12/1992 | Putnam et al. | 709/321 |
| 5,193,162 A | 3/1993 | Bordsen et al. | 711/152 |
| 5,193,180 A | 3/1993 | Hastings | 717/163 |
| 5,195,040 A | 3/1993 | Goldsmith | 364/443 |
| 5,231,640 A | 7/1993 | Hanson et al. | 371/68.3 |
| 5,276,860 A | 1/1994 | Fortier et al. | 714/6 |
| 5,280,612 A | 1/1994 | Lorie et al. | 707/8 |
| 5,280,619 A | 1/1994 | Wang | 710/200 |
| 5,283,870 A | 2/1994 | Joyce et al. | 711/152 |
| 5,295,258 A | 3/1994 | Jewett et al. | 714/12 |
| 5,317,726 A | 5/1994 | Horst | 714/12 |
| 5,321,706 A | 6/1994 | Holm et al. | 371/51.1 |
| 5,335,334 A | 8/1994 | Takahashi et al. | 711/164 |
| 5,357,612 A | 10/1994 | Alaiwan | 709/216 |
| 5,371,885 A | 12/1994 | Letwin | 707/205 |
| 5,386,524 A | 1/1995 | Lary et al. | 711/206 |
| 5,388,242 A | 2/1995 | Jewett | 711/113 |
| 5,404,361 A | 4/1995 | Casorso et al. | 371/40.1 |
| 5,423,037 A | 6/1995 | Hvasshovd | 707/202 |
| 5,423,046 A | 6/1995 | Nunnelley et al. | 713/330 |
| 5,426,747 A | 6/1995 | Weinreb et al. | 711/203 |
| 5,440,710 A | 8/1995 | Richter et al. | 711/207 |
| 5,440,727 A | 8/1995 | Bhide et al. | 711/117 |
| 5,440,732 A | 8/1995 | Lomet et al. | 707/1 |
| 5,454,091 A | 9/1995 | Sites et al. | 711/203 |
| 5,463,755 A | 10/1995 | Dumarot et al. | 711/148 |
| 5,465,328 A | 11/1995 | Dievendorff et al. | 714/15 |
| 5,475,860 A | 12/1995 | Ellison et al. | 710/26 |
| 5,479,648 A | 12/1995 | Barbera et al. | 713/322 |
| 5,497,476 A | 3/1996 | Oldfield et al. | 711/112 |
| 5,504,873 A | 4/1996 | Martin et al. | 711/111 |
| 5,513,314 A | 4/1996 | Kandasamy et al. | 714/6 |
| 5,524,212 A | 6/1996 | Somani et al. | 711/121 |
| 5,550,986 A | 8/1996 | DuLac | 710/100 |
| 5,551,020 A | 8/1996 | Flax et al. | 707/101 |
| 5,553,262 A * | 9/1996 | Ishida et al. | 711/123 |
| 5,555,404 A | 9/1996 | Torbjørnsen et al. | 707/202 |
| 5,557,770 A | 9/1996 | Bhide et al. | 74/424.86 |
| 5,566,316 A | 10/1996 | Fechner et al. | 711/114 |
| 5,568,629 A | 10/1996 | Gentry et al. | 711/114 |
| 5,581,750 A | 12/1996 | Haderle et al. | 707/202 |
| 5,584,008 A | 12/1996 | Shimada et al. | 711/114 |
| 5,584,018 A | 12/1996 | Kamiyama | 711/165 |
| 5,586,253 A | 12/1996 | Green et al. | 714/53 |
| 5,586,310 A | 12/1996 | Sharman | 707/10 |
| 5,606,681 A | 2/1997 | Smith et al. | 711/203 |
| 5,608,901 A | 3/1997 | Letwin | 707/205 |
| 5,613,105 A | 3/1997 | Zbikowski et al. | 707/203 |
| 5,619,671 A | 4/1997 | Bryant et al. | 711/202 |
| 5,627,961 A | 5/1997 | Sharman | 714/6 |
| 5,628,023 A | 5/1997 | Bryant et al. | 711/207 |
| 5,632,031 A | 5/1997 | Velissaropoulos et al. | 707/104.1 |
| 5,651,139 A | 7/1997 | Cripe et al. | 711/163 |
| 5,664,172 A | 9/1997 | Antoshenkov | 707/4 |
| 5,682,513 A | 10/1997 | Candelaria et al. | 711/113 |
| 5,687,392 A | 11/1997 | Radko | 710/22 |
| 5,721,918 A | 2/1998 | Nilsson et al. | 707/202 |
| 5,724,581 A | 3/1998 | Kozakura | 707/202 |
| 5,732,242 A * | 3/1998 | Mowry | 711/136 |
| 5,742,792 A | 4/1998 | Yanai et al. | 711/162 |
| 5,745,913 A | 4/1998 | Pattin et al. | 711/105 |
| 5,754,821 A | 5/1998 | Cripe et al. | 711/164 |
| 5,784,699 A | 7/1998 | McMahon et al. | 711/171 |
| 5,794,035 A | 8/1998 | Golub et al. | 709/104 |
| 5,802,600 A * | 9/1998 | Smith et al. | 711/173 |
| 5,809,527 A * | 9/1998 | Cooper et al. | 711/133 |
| 5,815,649 A | 9/1998 | Utter et al. | 714/6 |
| 5,838,894 A | 11/1998 | Horst | 714/11 |
| 5,850,632 A | 12/1998 | Robertson | 711/170 |
| 5,860,126 A | 1/1999 | Mittal | 711/167 |
| 5,894,560 A | 4/1999 | Carmichael et al. | 710/25 |
| 5,918,229 A | 6/1999 | Davis et al. | 707/10 |
| 5,920,876 A | 7/1999 | Unger et al. | 707/206 |
| 5,920,898 A | 7/1999 | Bolyn et al. | 711/167 |
| 5,933,838 A | 8/1999 | Lomet | 707/202 |
| 5,949,972 A | 9/1999 | Applegate | 714/54 |
| 5,953,742 A | 9/1999 | Williams | 711/154 |
| 5,956,756 A | 9/1999 | Khalidi | 711/207 |
| 5,959,923 A | 9/1999 | Matleson et al. | 365/222 |
| 5,960,459 A | 9/1999 | Thome et al. | 711/154 |
| 5,990,914 A | 11/1999 | Horan et al. | 345/521 |
| 5,996,055 A | 11/1999 | Woodman | 711/203 |
| 6,000,007 A | 12/1999 | Leung et al. | 711/105 |
| 6,012,106 A | 1/2000 | Schuman et al. | 710/22 |
| 6,012,120 A | 1/2000 | Duncan et al. | 710/129 |
| 6,016,495 A | 1/2000 | McKeehan et al. | 707/103 |
| 6,021,456 A | 2/2000 | Herdeg et al. | 710/260 |
| 6,026,465 A | 2/2000 | Mills et al. | 711/103 |
| 6,026,475 A | 2/2000 | Woodman | 711/202 |
| 6,047,343 A | 4/2000 | Olarig | 710/102 |
| 6,055,617 A | 4/2000 | Kingsbury | 711/203 |
| 6,065,017 A | 5/2000 | Barker | 707/202 |
| 6,067,550 A | 5/2000 | Lomet | 707/202 |
| 6,067,608 A | 5/2000 | Perry | 711/203 |
| 6,085,200 A | 7/2000 | Hill et al. | 707/202 |
| 6,085,296 A | 7/2000 | Karkhanis et al. | 711/147 |
| 6,098,074 A | 8/2000 | Cannon et al. | 707/200 |
| 6,105,075 A | 8/2000 | Ghaffari | 710/5 |
| 6,119,128 A | 9/2000 | Courter et al. | 707/202 |
| 6,119,214 A | 9/2000 | Dirks | 711/206 |
| 6,128,711 A | 10/2000 | Duncan et al. | 711/155 |
| 6,128,713 A | 10/2000 | Eisler | 711/159 |
| 6,134,638 A | 10/2000 | Olarig et al. | 711/167 |
| 6,138,198 A | 10/2000 | Garnett et al. | 710/129 |
| 6,141,722 A | 10/2000 | Parsons | 711/2 |
| 6,141,744 A | 10/2000 | Wing So | 712/35 |
| 6,141,769 A | 10/2000 | Petivan et al. | 714/10 |
| 6,202,129 B1 * | 3/2001 | Palanca et al. | 711/133 |

* cited by examiner

SYSTEMS AND METHODS FOR CACHING WITH FILE-LEVEL GRANULARITY

FIELD OF THE INVENTION

The present invention relates to implementing improved disk caching strategies in a computer. In particular, the present invention relates to a method for designating files as memory-resident, transient, or neither memory resident nor transient and appropriately caching the disk blocks associated with a designated file.

BACKGROUND OF THE INVENTION

When operating, computers typically utilize three types of memory. Persistent memories that are not based on optical or magnetic media, e.g., EEPROM or Flash ROM, store the Basic Input/Output System (BIOS), boot parameters, and other startup routines. A volatile memory such as RAMBUS dynamic RAM (RDRAM) or synchronous dynamic RAM (SDRAM) stores data and programs presently in use, e.g., the operating system. A persistent memory typically using optical or magnetic media stores data and programs that are not presently in use.

The differences between the technologies implementing the different memory types offer advantages and disadvantages. Memories based on optical or magnetic media retain information in the absence of electrical power. Volatile memories like SDRAM require electrical power to retain information, but typically offer faster access times. Persistent ROM memories offer faster access times and retain information in the absence of electrical power, but have limited storage capacity and operate mostly as read-only devices.

Recognizing the different advantages offered by different memory types, operating system designers have developed various techniques to permit software applications to achieve fast access to data while maintaining copies of the data that will survive the removal of electrical power. One family of techniques is called "disk caching." Disk caching attempts to retain certain selected data in volatile memory while storing other data in a persistent storage device. Since volatile memory for caching is typically limited in size relative to the memory available in a persistent storage device, designers of disk caching algorithms must decide which data to cache and which data to store in slower, persistent memory.

Some prior art computer systems address this problem by implementing RAM disk functionality. Referring to FIG. 1, a typical prior art computer system 10 includes a microprocessor 12, a-memory 14, and an input/output (I/O) controller 16 connected by a system bus 18. The system bus 18 permits one or more of these interconnected components to communicate through the exchange of data. For example, the microprocessor 12 may send read or write requests to the memory 14 or the I/O controller 16.

The memory 14 in a prior art computer 10 itself typically includes three types of memory. RAM 20 stores data and programs presently in use. Programs can be a user application 36, an operating system 26, or a device driver such as a disk driver 28. ROM 22 stores the BIOS 30 and other boot routines. The mass storage device 32 provides a persistent memory typically using optical or magnetic media.

Performance-critical applications using large amounts of data, such as database systems, store data on mass storage device 32. However, mass storage device 32 typically has slower access times than RAM 20. Therefore, a performance-critical application should use as much RAM 20 storage as possible. Purchasing and installing a solid-state mass storage device (not shown) will also result in a performance gain, but these devices tend to be expensive and have access times inferior to RAM 20 storage.

Typically, a performance-critical application is designed and coded to use RAM 20 storage. However, an operating system 26 using a virtual memory system to redirect memory operations from RAM 20 to mass storage 32 will redirect the read and write transactions from the application, hindering its performance. A virtual memory system can be bypassed by using a RAM disk scheme, setting aside a portion of RAM 20 for use as a virtual disk volume. User applications 36 interact with the RAM disk 34 as if it were a disk volume on a mass storage device 32, but having significantly improved access times. Using a RAM disk scheme ensures that performance-critical applications access RAM 20 without undertaking special programming measures.

The RAM disk approach has drawbacks. For example, in some RAM disk implementations, disk blocks stored in the RAM disk 34 are duplicated in the disk cache 24. This unnecessary duplication wastes space in RAM 20 and potentially saturates cache 24, further hindering accesses to files in mass-storage 32. Moreover, RAM disks have volume-level granularity: all the files on the virtual volume must be stored in RAM disk 34. It is generally not possible to set the attributes of individual files to ensure they stay in RAM 20, while marking other files for storage in mass storage 32. Therefore, it is desirable to provide functionality to designate individual files to ensure that they are encached in RAM 20 or stored in mass storage 32.

SUMMARY OF THE INVENTION

The present invention relates to the problem of disk caching for improved access to data files. One object of the invention is to provide methods for caching disk blocks on a per-file basis. Another object of the invention is to permit individual users or software applications to designate files as memory-resident or transient. Yet another object of the invention is to provide a programmed computer that can cache disk blocks on a per-file basis.

In one aspect, the present invention is a method for improved access to data files. First, a portion of volatile memory is designated for use as a cache memory. After the cache is established, files are designated as memory-resident. Data blocks and index blocks associated with memory-resident files are maintained in the cache memory. In one embodiment, a file can be designated memory-resident while it is in use by a software application. In another embodiment, the memory-resident state of the file can be set by a user or by a software application. In yet another embodiment, maintaining blocks associated with memory-resident files in cache memory includes the steps of accessing a data block or an index block associated with a memory-resident file and storing the contents of the block in the cache memory. In one embodiment, the volatile memory for the cache is random-access memory (RAM). In another embodiment, the memory-resident cache is a sub-cache of a designated cache memory. In yet another embodiment, users or software applications can modify the size of the memory-resident cache. In one embodiment, it is possible to set a maximum size for the memory-resident cache, and disk blocks are removed from the cache when the maximum size is exceeded. In another embodiment, it is possible to designate a memory-resident file as not memory-resident, and data blocks and index blocks associated with the file are subsequently subject to default caching methods, making them more likely to be removed from cache memory when demand exceeds capacity.

In another aspect, the present invention is a method for improved access to data files. First, a portion of volatile memory is designated for use as a cache memory. After the cache is established, files are designated transient. Data blocks and index blocks corresponding to transient files are maintained in cache memory for a nominal duration. In one embodiment, blocks associated with transient files are not written to mass storage until the passage of the nominal period of time, whereupon they are written and subsequently removed from cache memory. In another embodiment, a file can be designated transient while being accessed by a software application. In yet another embodiment, a user or software application can designate a file as transient. In one embodiment, the volatile memory for the cache is random-access memory (RAM). In another embodiment, it is possible to designate a transient file as not transient, and data blocks and index blocks associated with the file are subsequently subject to default caching methods, making them less likely to be removed from cache memory when demand exceeds capacity.

In still another aspect, the present invention is a programmed computer with an improved caching system. The computer includes a non-volatile memory having a file. The file has at least one disk block and an attribute field corresponding to the state of the file as memory-resident or transient. The computer also includes a volatile memory having a cache containing disk blocks associated with memory-resident files. The volatile memory also has queue structures containing data structures that correspond to the data blocks stored in the cache. These data structures are only removed from the queue when required by size limits imposed on the cache. In one embodiment, the size limits imposed on the cache may be increased or decreased. In another embodiment, the disk block is an index block or a data block associated with the file. In another embodiment, the queue is a first queue composed of data structures corresponding to disk blocks associated with memory resident files, and a second queue composed of data structures corresponding to disk blocks associated with transient files.

BRIEF DESCRIPTION OF THE DRAWINGS

These and other advantages of the invention may be more clearly understood with reference to the specification and the drawings, in which.

In the drawings, like reference characters generally refer to the same parts throughout the different views. The drawings are not necessarily to scale, emphasis instead being placed upon illustrating the principles of the invention.

DETAILED DESCRIPTION OF THE INVENTION

In brief overview, Applicant's invention provides systems and methods for implementing improved disk caching in a programmed computer. Improved disk caching is achieved through apparatus and methods that permit the designation of files as memory-resident, transient, or normal (i.e., neither memory-resident nor transient). The disk blocks associated with a memory-resident file are loaded immediately into cache memory in whole or in part, or are loaded on a block-by-block basis as they are accessed. The blocks of a memory-resident file remain in cache until the file is designated not memory-resident, whereupon the blocks become purgeable, or until cache size limits force the removal of blocks from the cache. The blocks are purged immediately in whole or in part, or displaced gradually as blocks from memory-resident files displace them. Disk blocks associated with a transient file that have been encached remain in the cache for a short, predetermined period of time before they are expired, removing them from the cache. If the contents of the block have changed while encached, then expiration is followed by writing the updated contents of the block to mass storage. Disk blocks associated with a file that is neither memory resident nor transient (i.e., a normal file), are cached and expired in accord with the default caching scheme used by the computer.

A file or type of file is designated memory-resident or transient at any time, even when it is in use by another software application. The disk blocks encached are data blocks, index blocks, or both. The cache for memory-resident files is a standard disk cache or a sub-cache within a standard disk cache. The size of the cache may change during operation, freeing RAM for use by other applications. If the cache is a sub-cache, then the remaining cache memory is used by other applications until needed for the caching of memory-resident files. When the total blocks stored from memory-resident files exceed the size of the memory-resident cache, the excess blocks are subject to expiration by the default caching algorithm, rendering them more likely to be removed when demand exceeds capacity.

Figure 1:
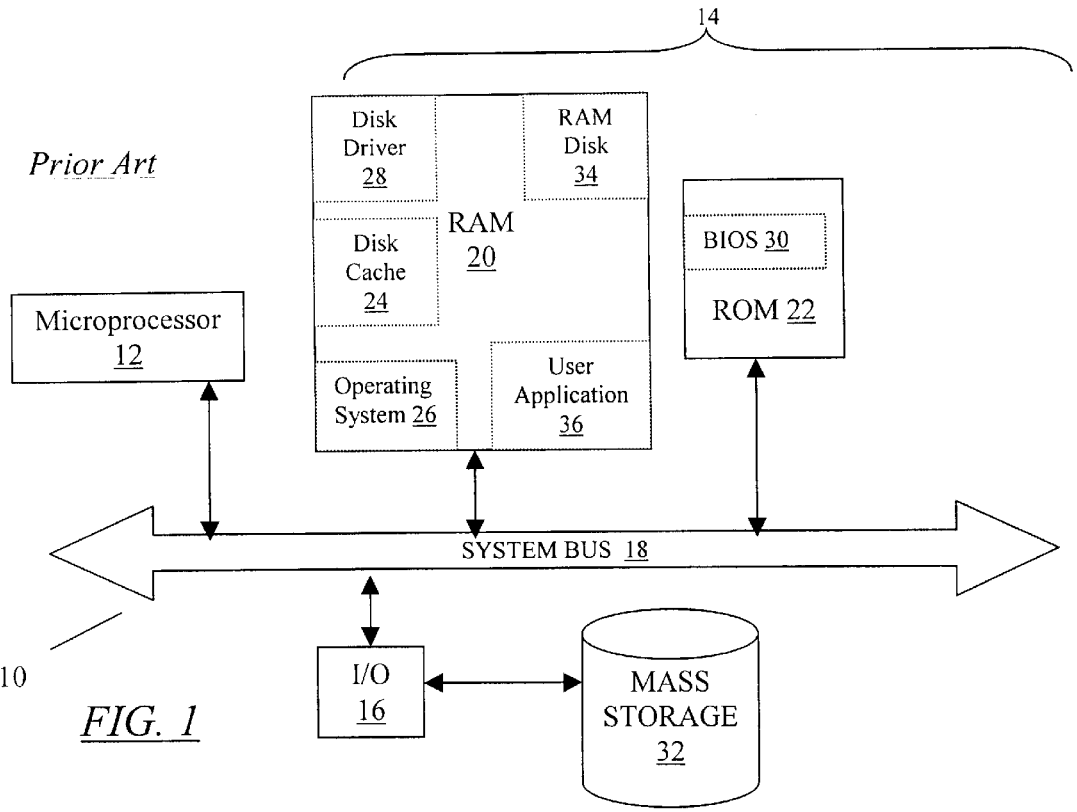
FIG. 1 is a block diagram of a prior art system with RAM disk functionality.
Figure 2:
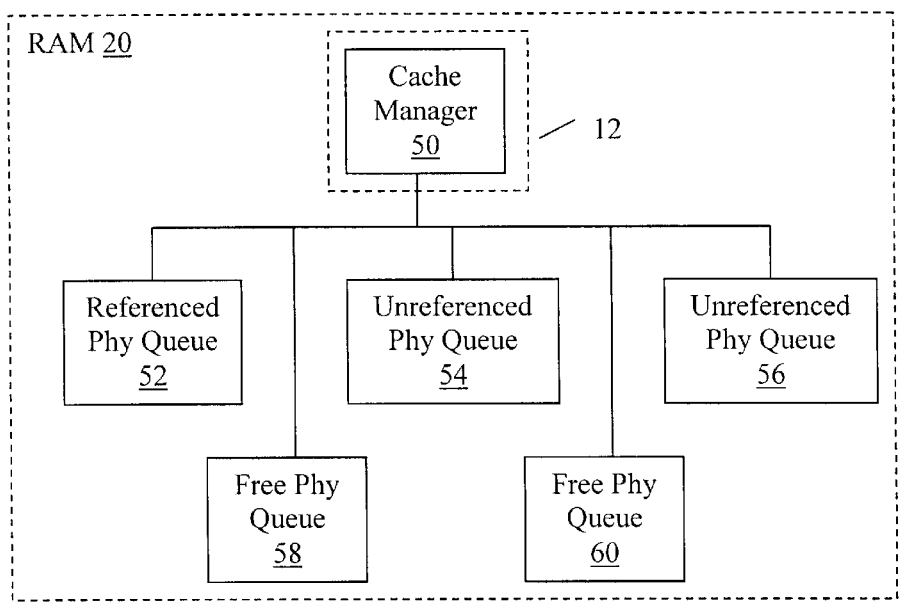
FIG. 2 is a block diagram of a prior art system with a disk cache with block-level granularity.

FIG. 2 depicts a prior art computer with normal disk cache functionality. Disk blocks likely to be accessed again are retained in a cache memory, thereby reducing read/write transactions to mass storage. In one embodiment, a cache manager 50 in the operating system 12 maintains multiple queues in RAM memory 20 containing data structures called "phys." In this embodiment, cache manager 50 uses phys to track the states of disk blocks stored in cache memory. The cache manager 50 includes subprograms that traverse the queues at regular intervals, moving phys between queues to indicate their current state. Parameters defining the cache are stored in a cache data structure (not shown), which in turn affects the behavior of the cache manager 50. Editing these parameters permits a user or software application to indirectly affect file caching behavior.

In one embodiment, individual phys are numbered and associated with 4 KB cache entries, wherein each cache entry represents the contents of a disk block. In this embodiment, each numbered phy contains information describing the disk block associated with the cache entry, the state of the cache entry (e.g., modified or unmodified), the caching mode of the entry, and other information required to maintain a disk caching system. As a phy grows old or its state changes, the cache manager 50 moves the phy between queues, implementing cache functionality. A phy is always associated with at least one queue; there are no unassociated phys.

In one embodiment, cache manager 50 maintains five queue structures. First queue 52 contains phys that point to disk blocks that are currently referenced, i.e., blocks that are presently in use by one or more software applications and have virtual addresses. Second queue 54 contains phys that point to disk blocks that are not presently in use by at least one software application and therefore are not currently referenced, but have virtual addresses. The third queue 56 contains phys that point to disk blocks that are not currently referenced and do not have virtual addresses. The fourth queue 58 contains phys for reuse with virtual addresses. The fifth queue 60 contains phys for reuse that lack virtual addresses. In some embodiments, referenced and unreferenced phys are maintained in the same queue, using the reference count value to distinguish between them.

A transaction directed to a disk block not currently encached associates a phy in the first queue 52 with the disk block after it has been accessed. In some instances, e.g., when a disk block is preread, the phy is unreferenced and is placed in the second queue 54 or the third queue 56 depending on the presence or absence of a virtual address. Phys move between the referenced queue 52 and the unreferenced queues 54 and 56 as they are referenced and then not referenced.

Cache manager 50 periodically reviews the referenced queue 52 for phy entries older than a predetermined time value. In one embodiment, this time value is 30 seconds. If the age of a phy exceeds this time value, cache manager 50 cancels the references to the block associated with the phy, releases the block associated with the phy, decrements the phy reference count to zero, and moves the phy to unreferenced queue 54 because all phys on the referenced list have virtual addresses. This type of phy expiration is rare, given that phys are typically requested and then subsequently released, causing the phy reference count to be non-zero only for a short period of time. A notable exception involves the reading of a sequential file. In this case, disk blocks are read but often not immediately released. Therefore, phys associated with these blocks may be expired for time reasons.

Next, cache manager 50 reviews both unreferenced queues 54 and 56 for phy entries older than a predetermined time limit. In one embodiment, this time limit is 5 minutes. The unreferenced phys are expired if they are older than this time limit. Upon expiration, a phy is moved to one of the free queues 58 and 60 (depending on whether the phy has a virtual address) and becomes available to track another disk block as described above.

Lastly, cache manager 50 reviews the free queues 58 and 60 for phy entries older than a predetermined time limit. If a phy is older than the predetermined time limit and the current cache size exceeds a minimum predetermined value, then the buffer associated with the phy is freed. The memory allocated for the phy structure itself is never freed, but is queued and used again, being reallocated when a phy is needed and the free lists have no available phys with a buffer.

Thus, by using data structures associated with disk block contents in memory and a series of queues to hold these data structures, the prior art computer system of FIG. 2 implements a disk caching system that keeps recently-accessed disk blocks in cache and expires older unaccessed blocks from the cache.

Figures 3, 4:
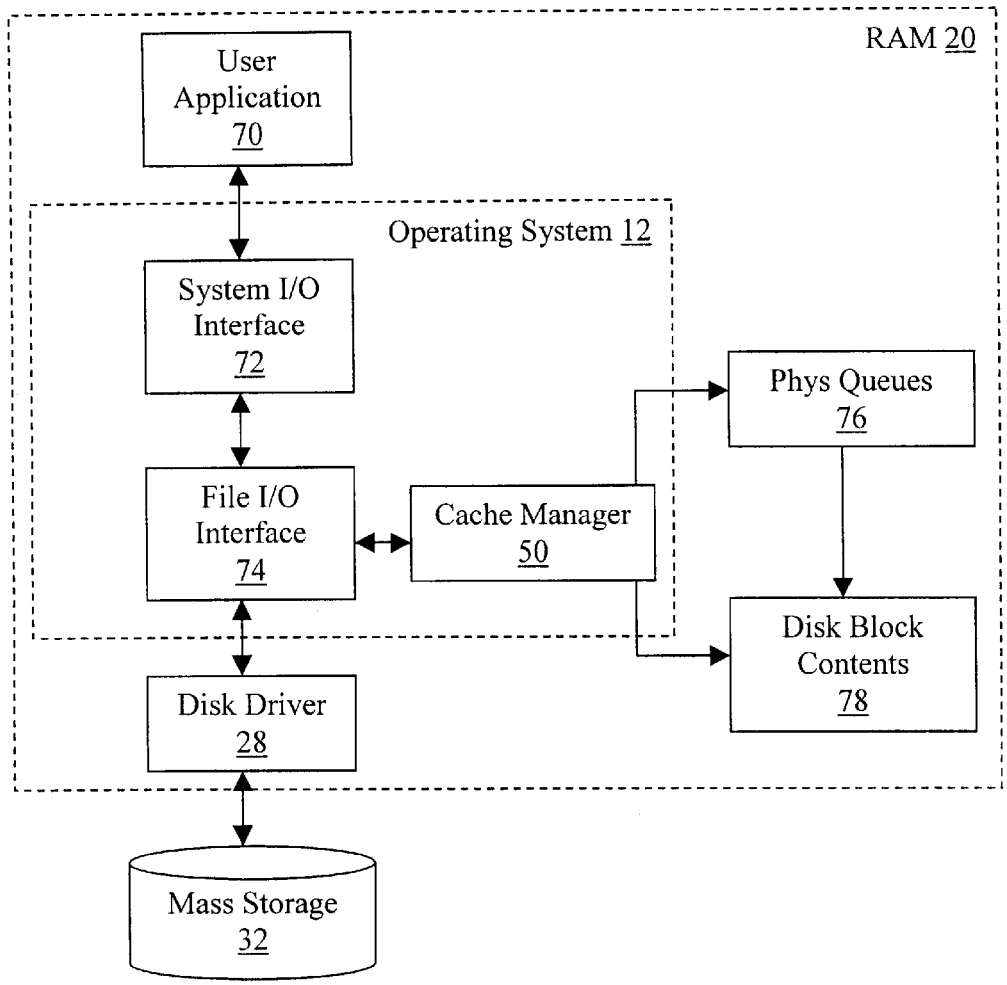
FIG. 3 is a block diagram of an embodiment of a computer constructed in accord with the present invention.
FIG. 4 is a diagram depicting the bits for a parameter value passed with an opcode used to control the treatment of individual files as memory-resident or transient.

FIG. 3 depicts a computer representing one embodiment of the present invention. In typical operation, a user application 70 executes a system call to designate a file or type of file memory-resident or transient. In some embodiments, the user operating the application 70 must have special system privileges. In one embodiment using the VOS operating system from Stratus Computer of Maynard, MA, the system call s$control passes a new control opcode $SET_{13}$ FILE_CACHE_MODES to the VOS operating system 12.

Referring to FIG. 4, in this embodiment the SET_FILE_ CACHE_MODES opcode for the s$control command is a 32-bit integer. If the low order bit 80 is set, the cache manager 50 treats the designated file as memory-resident and persistently caches data blocks associated with the file. If the next low-order bit 82 is set, the cache manager 50 treats the file as memory-resident and persistently caches index blocks associated with the file. If high-order bit 84 is set, the cache manager 50 treats the data blocks of the file as transient. Similarly, setting high-order bit 86 causes the cache manager 50 to treat the file's index blocks as transient. As discussed below, valid opcodes cannot simultaneously have bits 80 and 84 set, or bits 82 and 86 set.

Figure 5:
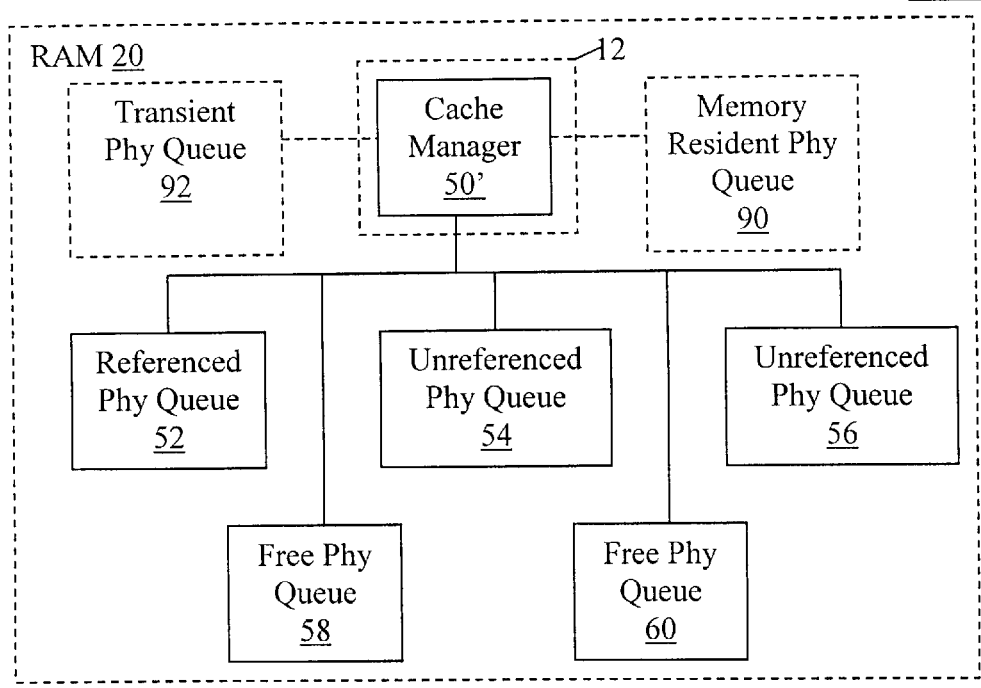
FIG. 5 is a block diagram of a computer embodying the present invention with two phy queues to support memory-resident and transient file caching.

Referring to FIG. 5, in one embodiment the addition of two new phy queues to the system of FIG. 2 enables memory-resident and transient caching. The first queue 90 caches phys that point to data and index blocks associated with memory-resident files. When an application initially accesses a disk block associated with a file, the attributes of the file are examined to determine if its data or index blocks are memory-resident, as discussed above. If so, the phys associated with the blocks are added to memory-resident queue 90. In one embodiment, the first queue 90 is actually two queues: one containing phys with virtual addresses and one containing phys without virtual addresses.

The second queue 92 caches phys that point to data and index blocks associated with transient files. If the attributes of a file whose blocks are being accessed indicate the file is transient, as discussed above, then the phys associated with the blocks associated with the file are added to transient queue 92. In one embodiment, the phys queued on the second queue 92 are also present on one of the other queues maintained by cache manager 50'.

Memory-resident behavior occurs through modifications to the cache manager 50 so that it never expires phys in memory-resident queue 90 merely because of their age. That is, in the prior art system of FIG. 2 the cached data associated with a phy may eventually be expired because the phy is older than a predetermined time limit. In contrast, the cache manager 50 in the present invention does not expire phys in queue 90 because they are older than a predetermined time limit. Ideally, the cached data associated with memory-resident files remains encached indefinitely, unless the file is subsequently designated non-memory resident, the file is no longer used by any applications, or the capacity of the memory resident cache is exceeded.

The maximum size of the cache limits the number of disk blocks that can be cached, which limits the number of phys associated with memory-resident files maintained in phy queue 90. Specifically, when the cache manager 50 periodically scans the phy queues, it also computes the maximum number of phys that can be stored based on the number of blocks that fit within the current maximum size of the cache memory. When that maximum number is exceeded, the cache manager 50 uses the default caching algorithms to determine the best candidate phys for expiration and removes the data associated with the best candidate phys until the cache size falls below the set limit. Similarly, if a user or a software application alters the size of the disk cache, changing the maximum number of memory-resident phys, then the size of the queues will be adjusted, removing the data associated with otherwise memory-resident phys.

In some embodiments, the size of the memory-resident cache can be altered by changing a system parameter specifying its size. In an embodiment where the memory-resident cache is a subcache of a normal cache memory, this parameter specifies a ratio between the size of the cache and the size of the subcache. Decreasing this ratio immediately reduces the size of the subcache, resulting in the expiration of disk blocks in excess of the size limit. Subsequently increasing the size of the disk cache permits flushed blocks to reenter the queue normally, as discussed above. If the memory-resident status of a file is changed, blocks associated with phys associated with the file are removed or added, as appropriate.

Attempts to disable memory-resident caching have no effect until the next time the cache manager 50 traverses the queues. In contrast, enabling memory-resident caching immediately affects phys associated with disk blocks at the next access of the block, assuming the blocks are not already encached. Blocks already encached are affected by the change in state the next time they are referenced.

In many ways the operation of the transient phy queue 92 is similar to that of the memory-resident phy queue 90. Like phys not in the memory-resident queue 90, phys in the transient queue 92 older than a predetermined time limit are expired. However, the predetermined time limit for transient phys is typically nominal, for example zero seconds, resulting in their immediate expiration from cache after being referenced. Designating files or certain types of files as transient reduces the amount of time that their associated blocks typically remain in cache, making resources available to cache other memory-resident or normal files.

For example, computers typically use log files to record transactions or other behavior for later review. Because a log file is frequently written to and infrequently read from, there is no benefit to caching the disk blocks associated with the log file. Designating a log file transient and setting the predetermined transient time limit to zero would in effect eliminate the blocks associated with the file from the cache, making resources available to cache other files.

It is sometimes desirable to expire the phys for blocks associated with transient files after a short, non-zero time period. For example, if a log file has a trailing one-time reader to subsequently reprocess written blocks, then setting the predetermined transient time limit to a small non-zero value facilitates this behavior by temporarily retaining the blocks associated with the file. Until the age of the transient phy exceeds the predetermined time limit, zero or non-zero, the block contents associated with a transient phy are not immediately written to mass storage. Once the block contents associated with a transient phy are written to mass storage, the block contents are eliminated from the cache.

Figure 6:
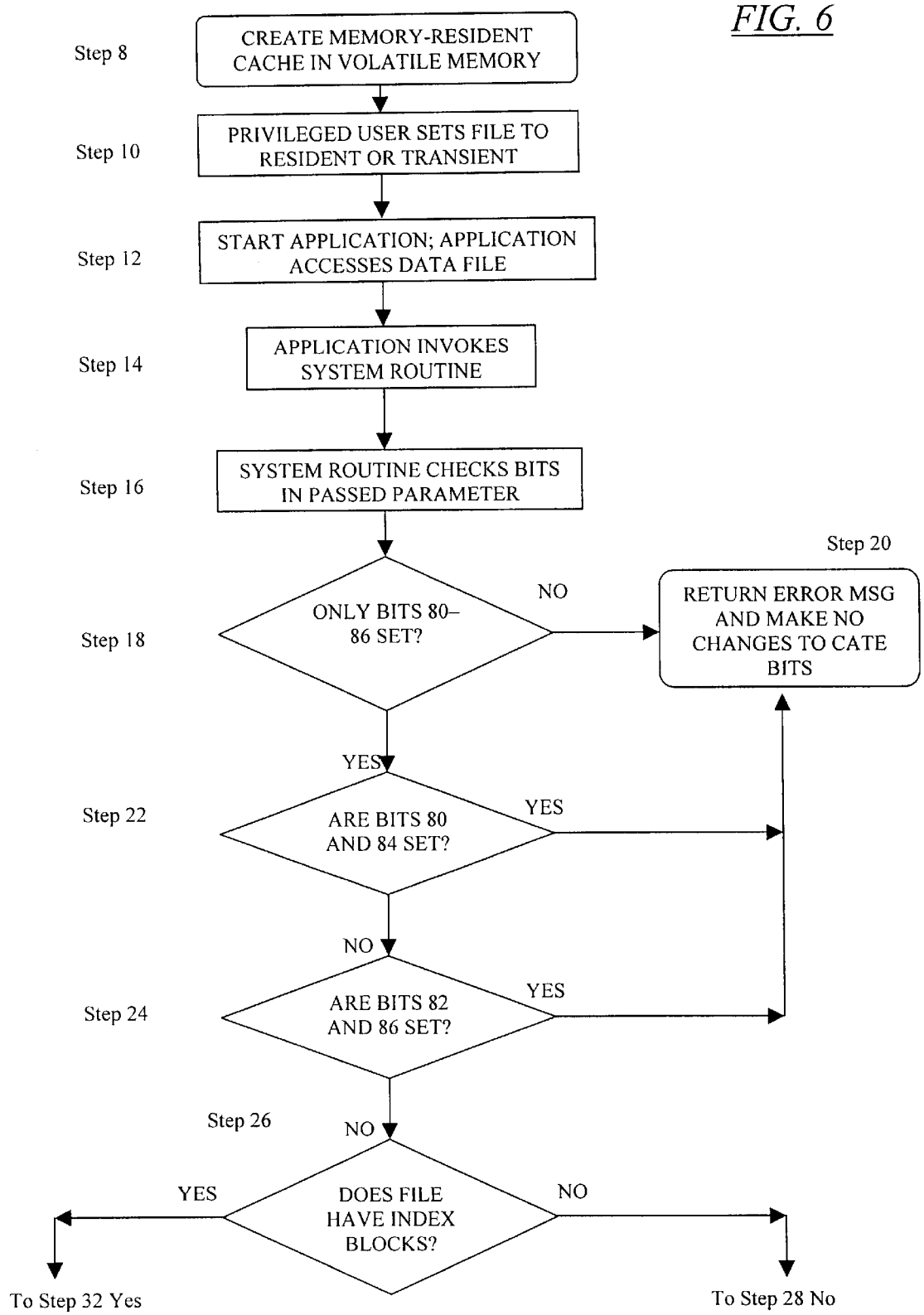
FIGS. 6 and 6A are a flowchart describing an embodiment whereby a user designates a file memory-resident.
Figure 6A:
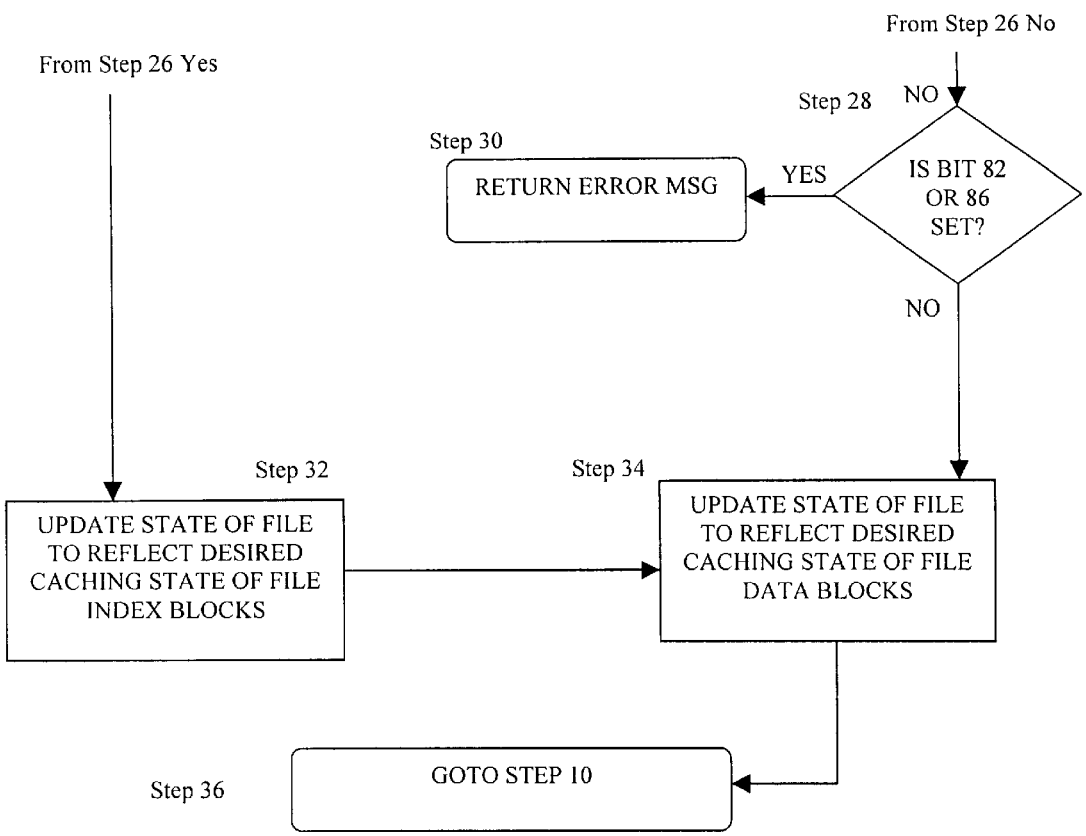

FIGS. 6 and 6A depict a flowchart illustrating how a file is designated memory-resident or transient. First, a cache for disk blocks associated with memory-resident files is created in random-access memory (Step 8). Next, a user either directly designates a file or type of file as memory-resident or transient, or indirectly does so by running a software application, for example, a file manager (Step 10). In some embodiments, the user must be a privileged user or an error condition is returned and the designation is rejected. In other embodiments, any user may make this designation. A software application receives the designation from the user (Step 12). The application invokes a system routine that designates a file or type of file as memory-resident or transient (Step 14). In one embodiment using the VOS operating system, this routine is the system command "s$control" with a 32-bit argument "SET_FILE_CACHE_MODES." The routine examines the value of the bits set in the passed argument (Step 16).

First, only the four lowest-order bits of the passed argument may be set (Step 18). Otherwise, an error condition is returned and the designation is rejected (Step 20). Next, referring to FIG. 4, bit 80 and bit 84 are examined (Step 22). The low-order bit 80 designates the data blocks of the file as memory-resident and the high-order bit 84 designates the data blocks of the file as transient. Since these conditions are mutually exclusive, a properly-formed argument cannot have both bits set. If both bit 80 and bit 84 are set, then an error condition is returned and the designation is rejected (Step 20).

Similarly, bits 82 and 86 are examined (Step 24). Again, referring to FIG. 4, bit 82 designates the index blocks of the file as memory-resident and bit 86 designates the index block of the file as transient. Since these conditions are mutually exclusive, a properly-formed argument cannot have both bits set. If both bits 82 and bits 86 are set, then an error condition is returned and the designation is rejected (Step 20).

The file is examined for associated index information (Step 26). If no index information is present but bits 82 or 86 are set (Step 28), then the argument passed is in error and a message is returned to the application indicating that no index information is associated with the file (Step 30). If no index information is present and neither the low-order bit 82 or the high-order bit 86 is set (Step 28), then system information is updated to reflect the desired caching state of the data blocks associated with the file (Step 34) before the process repeats itself (Step 36). If index information is present then system information is updated to reflect the desired caching state of the index blocks associated with the file (Step 32) and the desired caching state of the data blocks associated with the file (Step 34) before the process repeats itself (Step 36).

Figure 7:
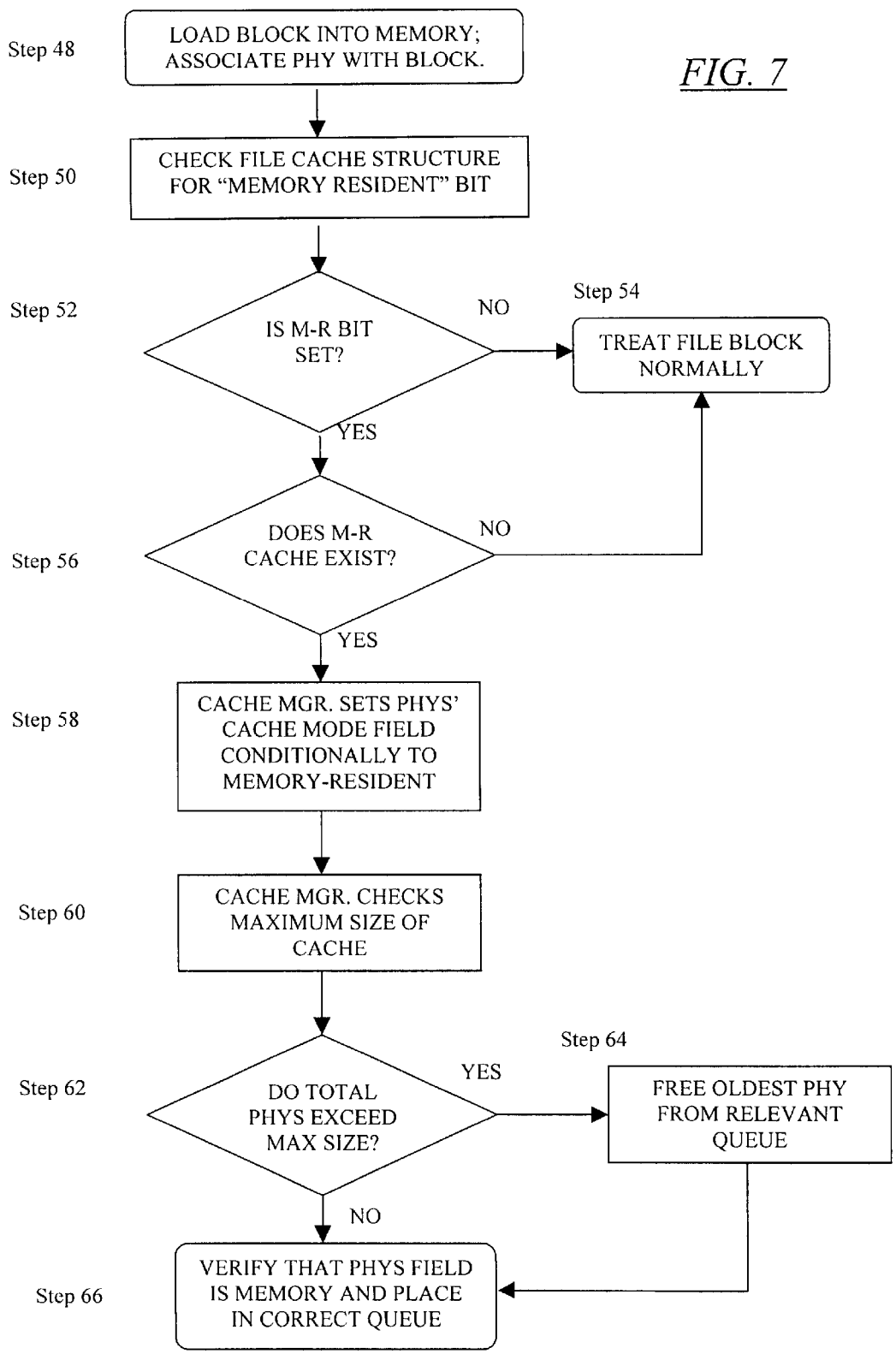
FIG. 7 is a flowchart describing a transaction relating to a memory-resident file.

FIG. 7 depicts one embodiment of a transaction involving a data block or index block associated with a file or type of file that has been designated memory-resident. First, a block associated with a file or type of file is accessed, stored in memory, and associated with a phy structure (Step 48). The appropriate memory structures are examined for information that would indicate that the data block or index block requested has been designated memory-resident (Step 50). If the file is not designated memory-resident (Step 52), or if the file is designated memory-resident but no memory-resident cache exists (Step 56), then the file blocks are processed in accord with the normal caching algorithm (Step 54). If the file is designated memory-resident and a cache for memory-resident files exists, then the cache manager 50 conditionally sets the condition of the phy to memory-resident (Step 58).

Before this condition can be confirmed, the cache manager 50 checks the maximum size limit of the cache (Step 60). In some embodiments, this can be a number; in others, a percentage of an existing cache. If the number of phys queued equals or exceeds the maximum number of phys that could be held in the specified maximum size (Step 62), then the oldest phy in the appropriate memory-resident queue is moved to the free phy queue for reuse (Step 64). If there are no phys in the memory-resident queues, then the oldest phy in the appropriate unreferenced phy queue is moved to the free phy queue for reuse (Step 64). Assuming there is no issue with the size of the cache, the phy is placed in the appropriate queue (Step 66).

Figure 8:
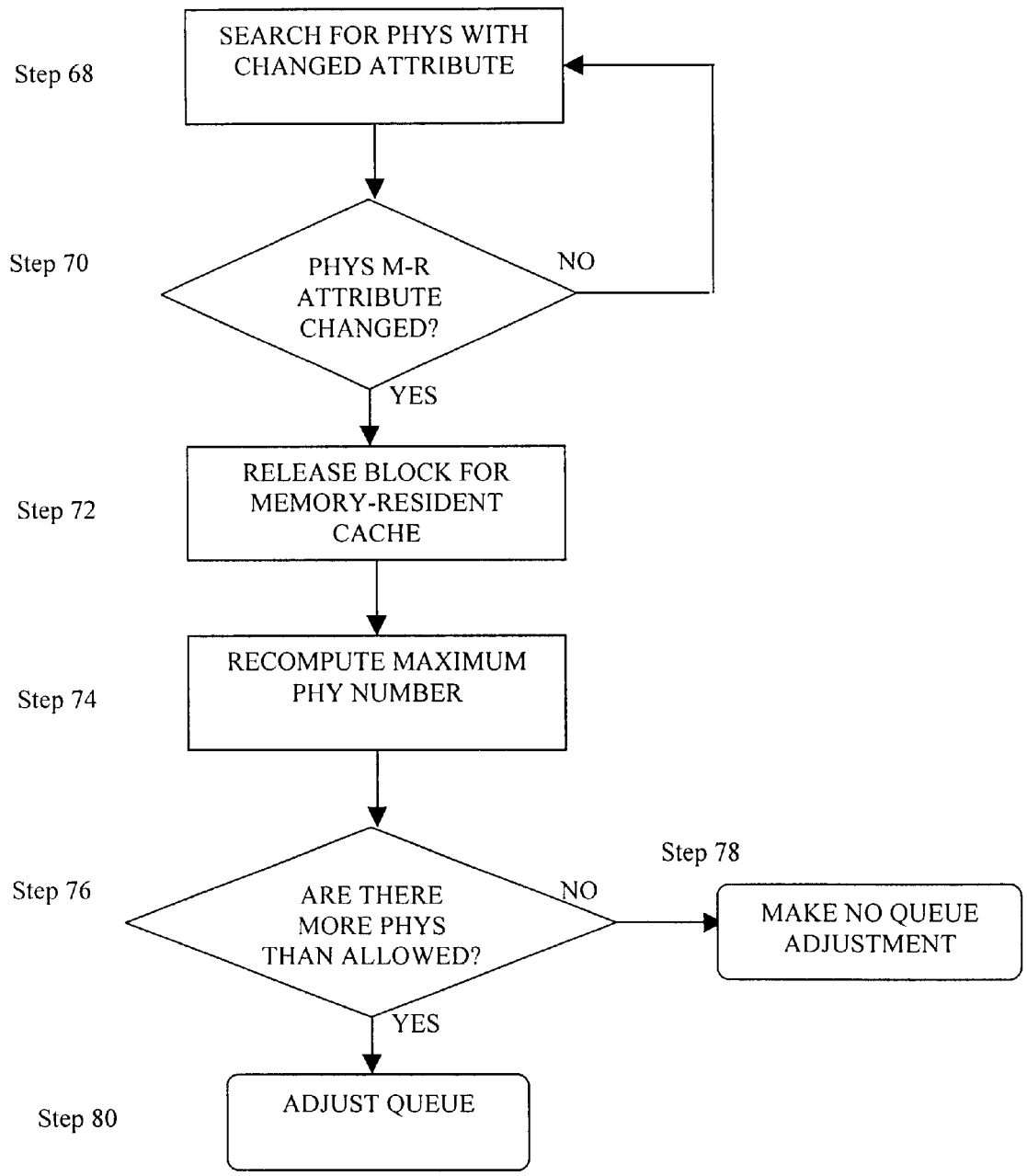
FIG. 8 is a flowchart describing the queue management techniques periodically executed by the cache manager 50.

FIG. 8 depicts one embodiment of the queue management techniques periodically executed by the cache manager. As discussed above, at periodic intervals the cache manager 50 sweeps the phy queues, looking for phys with changed attributes (Step 68). If no phys have changed attributes (Step 70), the cache manager 50 periodically repeats its sweep of the queues (Step 68). If a phy with a changed attribute is located (Step 68), then the phy is moved to the queue matching its changed attributes. For example, if a memory-resident file is designated not memory resident, all of the phys associated with cached blocks from the file will have their attributes changed from memory-resident to normal (i.e., neither memory resident or transient). These phys are removed from the memory-resident queues, removing their blocks from the memory-resident cache (Step 72).

If a user adjusts the size of the memory-resident cache, it is necessary to recompute the number of phys whose blocks can be stored in memory-resident cache (Step 74). If the new number of permitted phys is less than the number of phys currently enqueued (Step 76), it will become necessary for the cache manager to expire phys from the queue as discussed above (Step 80). If the new number of permitted phys exceeds the number of phys already enqueued this adjustment is unnecessary (Step 78).

Many alterations and modifications may be made by those having ordinary skill in the art without departing from the spirit and scope of the invention. Therefore, it must be expressly understood that the illustrated embodiment has been shown only for the purposes of example and should not be taken as limiting the invention, which is defined by the following claims. The following claims are thus to be read as not only literally including what is set forth by the claims but also to include all equivalent elements for performing substantially the same function in substantially the same way to obtain substantially the same result, even though not identical in other respects to what is shown and described in the above illustrations.

What is claimed is:

1. A method for improved access to data files comprising the steps:
    (a) designating a portion of volatile memory to be used as a cache memory;
    (b) receiving a designation of a file as memory resident;
    (c) maintaining at least one of a data block and an index block corresponding to said designated file in said cache memory regardless of its age;
    (d) receiving an indicator corresponding to a maximum size of said cache memory; and
    (e) limiting the size of said cache memory to said maximum size indicated by removing a maintained data block from said cache memory.

2. The method of claim 1 wherein step (b) occurs while an application is accessing said data file.

3. The method of claim 1 wherein step (b) comprises a user designating a file as memory-resident.

4. The method of claim 1 wherein step (b) comprises a computer program designating a file as memory-resident.

5. The method of claim 1 wherein step (c) comprises the steps:
    (c-a) accessing at least one of a disk block and an index block associated with a designated file in a non-volatile memory; and
    (c-b) storing the contents of said accessed block in said cache memory.

6. The method of claim 1 wherein said volatile memory is random-access memory (RAM).

7. The method of claim 1 wherein said cache memory is a sub-cache memory contained within a cache memory.

8. The method of claim 1 further comprising the step of (d) modifying the size of the cache memory.

9. The method of claim 8 wherein step (d) is performed by the user.

10. The method of claim 8 wherein step (d) is performed without user interaction.

11. The method of claim 1 further comprising the steps of:
    (d) receiving a designation of a data file as not memory-resident; and
    (e) processing at least one of a data block and an index block corresponding to said designated file using default caching methods.

12. A method for improved access to data files comprising the steps:
    (a) designating a portion of volatile memory to be used as a cache memory;
    (b) receiving a designation of a file as transient;
    (c) maintaining at least one of a data block and an index block corresponding to said designated file in said cache memory for a nominal duration; and
    (d) removing said at least one of said data block and said index block corresponding to said designated file from said cache memory immediately after said at least one of said data block and said index block is referenced.

13. The method of claim 12 wherein step (c) further comprises
    delaying writing said at least one of a data block and an index block corresponding to said designated file to a non-volatile memory until the passage of said nominal duration; and step (d) comprises
    removing said at least one of a data block and an index block corresponding to said designated file from said cache memory immediately after the completion of foregoing step.

14. The method of claim 12 wherein step (b) occurs while an application is accessing said data filed.

15. The method of claim 12 wherein step (b) is performed by a user.

16. The method of claim 12 wherein step (b) is performed without user interaction.

17. The method of claim 12 wherein said volatile memory is random-access memory (RAM).

18. The method of claim 12 further comprising the steps of:
    (e) receiving a designation of a data file as not transient; and
    (f) processing at least one of a data block and an index block corresponding to said designated file using default caching methods.

19. A programmed computer with an improved cache system, comprising:
    a non-volatile memory comprising a file, said file comprising:
        a disk block; and
        an attribute field having a value equal to at least one of transient and memory-resident; and a volatile memory comprising:
- a cache comprising a data block, said data block corresponding to a file whose attribute field has a value equal to memory-resident; and
- a queue comprising a data structure, said data structure corresponding to a data block stored in said cache, wherein said data structure may only be removed from said queue in satisfaction of size constraints on said cache.

20. The computer of claim 19 wherein said size constraints on said cache may be modified.

21. The computer of claim 19 wherein said disk block is at least one of an index block and a data block.

22. The computer of claim 19 wherein said queue comprises:
- a first queue comprising a data structure, said data structure corresponding to a disk block, said disk block corresponding to a file whose attribute field has a value equal to memory-resident; and
- a second queue comprising a data structure, said data structure corresponding to a disk block, said disk block corresponding to a file whose attribute field has a value equal to transient.

* * * * *